UNITED STATES PATENT OFFICE

STEWART J. CARROLL, OF ROCHESTER, NEW YORK, ASSIGNOR TO EASTMAN KODAK COMPANY, OF ROCHESTER, NEW YORK, A CORPORATION OF NEW YORK

CELLULOSE ACETATE COMPOSITION

No Drawing.   Application filed March 9, 1929.   Serial No. 345,895.

This invention relates to cellulose acetate compositions in which the cellulose acetate is combined with other substances.

In the manufacture of products from cellulose acetate, it has been found necessary to combine therewith compounds which will render the products more suitable for various commercial purposes. For example, when cellulose acetate is used for the manufacture of photographic films, without the addition of certain plastifying bodies, its inflammability is high and it, therefore, cannot be used safely for many purposes, such, for example, as a support for amateur motion picture film. These addition compounds are used likewise to increase the flexibility, transparency and other properties which enhance the value of the resulting product when used in the film, lacquer or analogous plastic arts.

It is the object of the present invention to provide a cellulose acetate having the hereinabove described desirable properties and particularly a cellulose acetate composition having low inflammability.

I have found that cellulose acetate compositions having the desirable qualities enumerated above can be obtained by combining cellulose acetate, preferably of the acetone soluble type, with the halogenated acetamides. The acetamides which are suitable are, for example, the mono di or tri halogenated acetamides.

I have found that compositions of cellulose acetate containing certain proportions of these acetamides have a surprising degree of practical non-inflammabilty,—that is, unexpected slowing down of the propagation of combustion therein. Films embodying such compositions, when ignited, often go out and must be reignited during the test, the flame traveling along the film very slowly. Films embodying such compositions not only possess this remarkable slow burning quality, but are effectively colorless when proper precautions in compounding are taken. By effectively colorless, I mean their color is less than that permitted by the customary tolerances of the film manufacturer.

In one form of my invention, I dissolve, by way of example, 100 parts by weight of acetone-soluble cellulose acetate in 300 to 500 parts by weight of acetone along with 5 to 50 parts by weight of trichlor acetamide. In the preferred form of my invention, I combine 100 parts of the acetone-soluble cellulose acetate with 400 parts by weight of acetone in the presence of 20 parts of trichlor acetamide.

The ingredients are thoroughly mixed to form a homogeneous solution or flowable mass, which is filtered if necessary. When more flowable solutions are desired, or when the compositions are to be used in lacquers, a volatile solvent may be incorporated, or volatile non-solvents, such as benzol, alcohol and the like, may be added, but not to the point where precipitation of the cellulose acetate results. While I prefer the relatively simple formula given above, I may add one or more organic bodies of only slight volatility which enhance the plasticity or flexibility of articles formed from such compositions and which also regulate the deposition of the films from the solution. Examples of them are amyl, or butyl acetate, the various amyl alcohols, the various butyl alcohols and mixtures of them.

The formation of film by the evaporation of the volatile ingredients from the hereinabove described composition results in a flexible, smooth, transparent and flame-resisting product suitable for many of the demands of the photographic industry. It will, of course, be understood that various changes may be made in the proportions given and known equivalents of the compounds used without in any way departing from this invention or sacrificing any of the advantages derived therefrom.

Having thus described my invention, what I claim as new and desire to secure by Letters Patent is:

1. A composition of matter comprising cellulose acetate and a halogenated acetamide in which one or more of the hydrogens of the $CH_3$ group are substituted by a halogen atom.

2. A composition of matter comprising cellulose acetate and trichlor acetamide.

3. A composition of matter comprising cellulose acetate 10 parts, trichlor acetamide 0.5 to 5.0 parts, acetone 30 to 50 parts.

4. As an article of manufacture, a sheet of deposited or flowed cellulose acetate containing a halogenated acetamide in which one or more of the hydrogens of the $CH_3$ group are substituted by a halogen atom.

5. As an article of manufacture, a sheet of deposited or flowed cellulose acetate containing trichlor acetamide.

Signed at Rochester, New York, this 28th day of February, 1929.

STEWART J. CARROLL.